(12) United States Patent
Khan et al.

(10) Patent No.: US 9,246,669 B2
(45) Date of Patent: Jan. 26, 2016

(54) APPARATUS AND METHOD FOR MODULAR SIGNAL ACQUISITION AND DETECTION

(71) Applicant: Analog Devices Technology, Hamilton (BM)

(72) Inventors: Muhammad Kalimuddin Khan, Rochestown (IE); Philip E. Quinlan, Glounthaune (IE); Kenneth J. Mulvaney, Coolaney (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 14/285,415

(22) Filed: May 22, 2014

(65) Prior Publication Data

US 2015/0341161 A1    Nov. 26, 2015

(51) Int. Cl.
*H04L 27/10* (2006.01)
*H04L 7/033* (2006.01)

(52) U.S. Cl.
CPC ............. *H04L 7/033* (2013.01); *H04L 27/10* (2013.01)

(58) Field of Classification Search
CPC ..... H04L 7/033; H04L 7/0337; H04L 7/0331; H04L 7/0338; H03L 7/0814
USPC ........................... 375/373, 371, 354
See application file for complete search history.

(56) References Cited

U.S. PATENT DOCUMENTS

| | | | |
|---|---|---|---|
| 5,347,542 A | 9/1994 | Kurby et al. | |
| 7,106,803 B1 | 9/2006 | Hsu | |
| 7,352,831 B2 | 4/2008 | Quinlan et al. | |
| 7,995,698 B2 | 8/2011 | Liu et al. | |
| 2008/0137790 A1 | 6/2008 | Cranford et al. | |
| 2011/0001531 A1 | 1/2011 | Nishi et al. | |
| 2013/0034352 A1* | 2/2013 | Liu ................................ | 398/29 |

OTHER PUBLICATIONS

Analog Devices, "ADF7021-V High performance narrow-band transceiver IC", Rev. 0, pp. 1-60 (2010).
European Search Report in Application No. EP 15 16 7825, dated Sep. 22, 2015.

\* cited by examiner

*Primary Examiner* — Zewdu Kassa
(74) *Attorney, Agent, or Firm* — Knobbe, Martens, Olson & Bear LLP (57) ABSTRACT

Apparatus and method for acquiring and tracking a data signal are disclosed. Two different CDR circuits are configured to acquire and track data based on two different modulation schemes. While in the acquisition mode, the first CDR circuit may acquire data signal by sampling the signal at a reduced clock rate and handover to the second CDR circuit when a preamble is found. Also in the acquisition mode, the data acquisition and tracking circuit may determine the power level of the preamble signal and dynamically adjust the threshold level for the tracking period upon finding of the preamble.

20 Claims, 7 Drawing Sheets

APPARATUS AND METHOD FOR MODULAR SIGNAL ACQUISITION AND DETECTION

BACKGROUND

1. Field of the Invention

The invention generally relates to electronics, and in particular, to signal acquisition and detection.

2. Description of the Related Art

Electronic systems such as transceivers receive data modulated by various schemes and have modules performing clock and data recovery, or symbol timing recovery. Clock and data recovery often uses an oversampled digital phase lock loop (DPLL) operating at a clock frequency higher than a target data rate and may be designed to acquire demodulated data acquired from a modulated data stream. The data stream may be modulated by various schemes such as frequency shift keying (FSK). A data acquisition and tracking system can be designed to detect preamble of a modulation scheme to achieve signal acquisition and tracking.

SUMMARY

One embodiment includes an apparatus comprising a first signal processing circuit configured to receive an input signal, wherein the first signal processing circuit is configured to acquire phase lock and/or track phase lock to the input signal for at least a first modulation scheme, wherein the first signal processing circuit is configured to sample a preamble portion of a waveform of the input signal at a first clock rate to acquire phase lock for a second modulation scheme, a second signal processing circuit configured to receive the input signal, wherein the second signal processing circuit is configured to at least track phase lock to the input signal for the second modulation scheme at a second clock rate, wherein the second clock rate is faster than the first clock rate, and a controller configured to receive an indication of which of at least the first modulation scheme or the second modulation scheme is applicable, to activate the first signal processing circuit for acquisition and tracking of the input signal in the first modulation scheme, to activate the first signal processing circuit for acquisition of the input signal in the second modulation scheme, and to activate the second signal processing circuit for tracking of the input signal in the second modulation scheme.

One embodiment includes an electronically-implemented method of signal processing, the method comprising sampling a preamble portion of a waveform of an input signal at a first clock rate with a preamble detection mechanism for a first modulation scheme to acquire phase lock for a second modulation scheme, tracking phase lock to the input signal for the second modulation scheme at a second clock rate, wherein the second clock rate is faster than the first clock rate, and receiving an indication of which of at least the first modulation scheme or the second modulation scheme is applicable, to activate acquisition and tracking of the input signal in the first modulation scheme at the second clock rate, to activate acquisition of the input signal in the second modulation scheme at the first clock rate, and to activate tracking of the input signal in the second modulation scheme at the second clock rate.

One embodiment includes an apparatus for signal processing, the apparatus comprising a means for sampling a preamble portion of a waveform of an input signal at a first clock rate with a preamble detection mechanism for a first modulation scheme to acquire phase lock for a second modulation scheme, a means for tracking phase lock to the input signal for the second modulation scheme at a second clock rate, wherein the second clock rate is faster than the first clock rate, and a means for receiving an indication of which of at least the first modulation scheme or the second modulation scheme is applicable, to activate acquisition and tracking of the input signal in the first modulation scheme at the second clock rate, to activate acquisition of the input signal in the second modulation scheme at the first clock rate, and to activate tracking of the input signal in the second modulation scheme at the second clock rate.

BRIEF DESCRIPTION OF THE DRAWINGS

These drawings and the associated description herein are provided to illustrate embodiments of the invention and are not intended to be limiting.

DETAILED DESCRIPTION OF THE PREFERRED EMBODIMENT

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to cover such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

For use in a variety of applications, an integrated circuit can include two or more clock and data recovery (CDR) modules for acquisition and tracking of signals of different modes. Embodiments of the invention take advantage of the presence of multiple CDRs for multiple different modes and utilize a first CDR for acquisition and tracking to a signal of a first mode, and utilize the first CDR for acquisition of, but not tracking to, a signal of a second mode. The second signal is tracked by the second CDR, which, in one embodiment, is not capable of acquiring the signal on its own.

Figure 1:
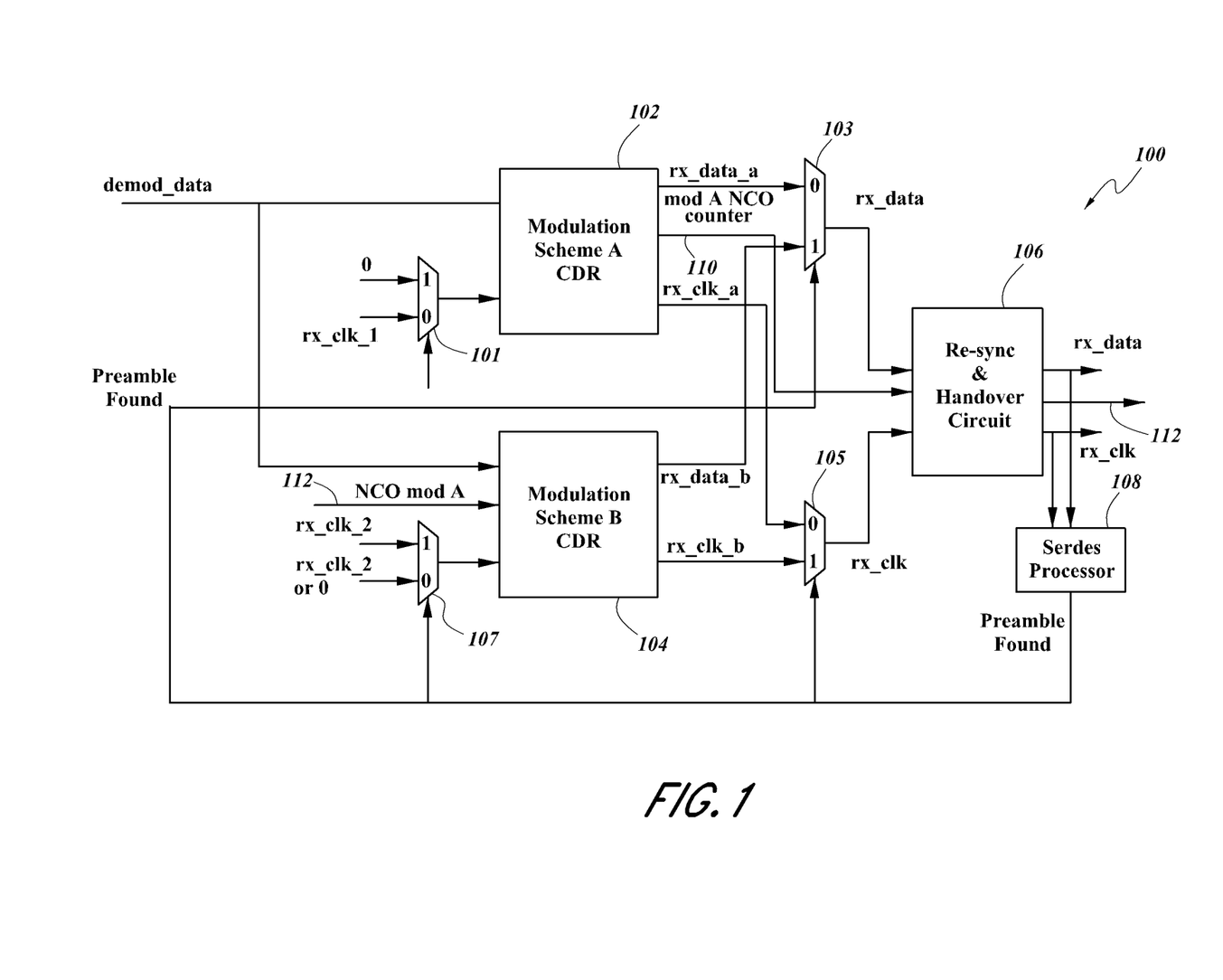
FIG. 1 is a schematic block diagram illustrating an example modular signal acquisition system according to one embodiment.

Referring to FIG. 1, a schematic block diagram illustrating an example modular signal acquisition system will be described below. The illustrated system 100 includes a first clock multiplexer 101, a CDR module A 102, a data multiplexer 103, a CDR module B 104, a second clock multiplexer 105, a re-sync and handover circuit 106, a third clock multiplexer 107, and a serializer/deserializer (SerDes) processor 108. The system 100 may be implemented within systems such as a network device to acquire and track data streams that are modulated by two different modulation schemes with two different preamble sequences. Example modulation schemes include 2-FSK, or binary FSK, 3-FSK, or ternary FSK, and 4-FSK depending on the number of digital levels represented in discrete frequencies. For example, the CDR module A 102 may be a 2 or 4-FSK CDR module while the CDR module B 104 may be a 3-FSK CDR module since the preamble sequence for the 3-FSK modulation scheme is different from the preamble sequence for the 2 or 4-FSK modulation scheme. The CDR module A 102 and the CDR module B 104 can be different circuits. In alternative embodiments, the CDR module A 102 and the CDR module B 104 can be different instances of a common circuit design that is configurable with programmable parameters, such as parameters for signal-to-noise ratio, threshold bandwidth, or the like, such that the CDR module A 102 and the CDR module B 104 differ in behavior during operation. The system 100 may also receive one or more clock signals that are used to run each module of the system 100. A clock signal may have a rate higher than a target data rate. For example, the clock rate may be about 16 times or 32 times higher than the target data rate, and the selection of the clock rates will be further discussed below. Other clock rates will be applicable and readily determined by one of ordinary skill in the art. The selection of clock rate can be subject to a tradeoff between performance and power consumption. The system 100 is configured to receive a data signal and perform acquisition and detection as discussed below. One or more modules of the system 100 may have additional input or output signals such as enable, reset, and clock signals not shown in FIG. 1 as they may be apparent to those with ordinary skill in the art.

An input signal to the system 100 is provided to a demodulator (not shown), which provides a demodulated signal demod data as an output. The type of demodulator will vary based on the system 100, and in the illustrated embodiment corresponds to frequency shift keying (FSK) demodulator. However, other types of demodulators will also be applicable. The CDR module A 102 may receive the demodulated signal demod data and a clock rate multiplexer output from the first clock multiplexer 101, which may be determined by a preamble found signal. The CDR module A 102 may output signals rx_data_a, or a recovered data stream A, rx_clk_a, or a recovered clock rate A, and a mod A numerically controlled oscillator (NCO) counter signal 110. When the CDR module A 102 receives demod data and the preamble found signal indicates that no preamble is found, the first clock multiplexer 101 may output rx_clk_1 to the CDR module A 102. The CDR module A 102 may use the rx_clk_1 signal to sample the demod data signal to generate the rx_data_a signal and generate the rx_clk_a signal. When the CDR module A 102 receives the demod data signal and the preamble found signal indicates that a preamble is found, the clock multiplexer 101 may output a 0 to the CDR module A 102, indicating that the rx_clk_1 signal should no longer be used after the preamble is found. In alternative embodiments, the clock multiplexer 101 can be replaced by a different logic element, such as a logic circuit performing a logical AND of the rx_clk_1 signal and the inverse of the preamble found signal.

The CDR module A 102 may also output the mod A NCO counter signal 110 to synchronize the CDR module A 102 and the CDR module B 104 when the preamble is found. In one implementation, the mod A NCO counter signal 110 may be received and forwarded by a signal estimator 202 (FIG. 2A, discussed below) to the CDR module B 104 as an NCO mod A signal 112. In other implementations, the mod A NCO counter signal 110 may be the same as the NCO mod A signal 112 and be directly fed to the CDR module B 104. The CDR module A 102 may be a 2- or 4-FSK CDR, which implements the 2- or 4-FSK modulation scheme whose demodulated data preamble sequence is +1, −1, +1, −1, . . . . The rx_clk_1 signal may be selected to be different from the regular acquisition clock rate to take advantage of the differences between one modulation scheme and another. For example, if a 2- or 4-FSK CDR acquisition system regularly uses a clock signal having a frequency that is about 32 times that of the data rate, the rx_clk_1 signal may be a clock signal having a frequency that is about 16 times that of the data rate when it is set to acquire 3-FSK signal. The selection of the rx_clk_1 clock rate is discussed in detail below in connection with the rx_clk_1 clock signal.

The CDR module B 104 may receive the demodulated signal demod data, the NCO mod A signal 112, and a clock rate multiplexer output, which may be determined by the preamble found signal. The CDR module B 104 may output rx_data_b, or a recovered data stream B, and rx_clk_b, or a recovered clock rate B. When the CDR module B 104 receives the demod data signal and the preamble found signal indicates no preamble is found, the third clock multiplexer 107 may output 0, indicating that the rx_clk_2 signal is not used while no preamble is found. In one implementation, the CDR module B 104 may receive the rx_clk_2 signal without the third clock multiplexer 107, in which case the CDR module B 104 may receive the rx_clk_2 signal regardless of a finding of a preamble. When the CDR module B 104 receives the demod data signal and the preamble found signal indicates a preamble is found, the third clock multiplexer 107 may output rx_clk_2 to operate data acquisition at the clock rate of rx_clk_2 after the preamble is found. Then, the CDR module B 104 may use the rx_clk_2 signal to sample the demod data signal to generate the rx_data_b signal and generate the rx_clk_b signal.

The CDR module B 104 may also receive the NCO mod A signal 112 either from the signal estimator 202 (FIG. 2A, discussed below), or the CDR module B 104 may receive the NCO counter signal 110 directly from the CDR module A 102. The CDR module B 104 may be a 3-FSK CDR, which implements the 3-FSK modulation scheme whose demodulated preamble sequence is +1, +1, −1, −1, +1, +1, −1, −1, . . . . The rx_clk_2 signal may be the regular acquisition clock rate that is different from the rx_clk_1 signal. For example, if the 2-, 3-, and 4-FSK CDRs in the system 100 use a clock signal that is about 32 times higher in frequency than that of the data for regular acquisition, the rx_clk_2 signal may be at about 32 times the data rate while the rx_clk_1 signal may be at about 16 times the data rate as discussed in an example above.

The selection of the rx_clk_1 and rx_clk_2 clock rates may take advantage of the different preamble sequences of the 2- or 4-FSK modulation schemes and the 3-FSK modulation scheme. For example, 2- and 4-FSK data may have the demodulated data preamble sequence of +1, −1, +1, −1, . . . while 3-FSK data may have the demodulated data preamble sequence of +1, +1, −1, −1, +1, +1, −1, −1, . . . . Assuming the demodulated data of +1/−1 are received at the same frequency for these sequences, the rate of demodulated data alternating between +1 and −1 for the 2- or 4-FSK scheme preamble is twice as fast as that of 3-FSK scheme preamble. Therefore, rather than using the same clock rates and different mechanisms to acquire +1, −1, +1, −1, . . . and +1, +1, −1, −1, +1, +1, −1, −1, . . . , the latter sequence (+1, +1, −1, −1, +1, +1, −1, −1, . . . ) can be detected using the a clock rate half the rate of the clock rate used to detect the former sequence (+1, −1, +1, −1, . . . ) using the same acquisition mechanism. For example, the regular local clock rate may be at about 32 times the data rate, and instead of detecting the sequence of +1, +1, −1, −1, +1, +1, −1, −1, . . . for the 3-FSK scheme at about 32 times the data rate, the system 100 may configured to detect "+1, −1, +1, −1, . . . " at about 16 times the data rate as if it is detecting the 2- or 4-FSK preamble sequence. Utilizing a 2-FSK CDR instead of a 3-FSK CDR to acquire 3-FSK signal, for example, can be advantageous because a 2-FSK CDR can be more flexible than a 3-FSK CDR with regard to acquisition bandwidth and speed. The acquisition clock rates discussed here, such as 16 or 32 times the data rate, are only an example implementation of the disclosure herein, and a person of ordinary skill in the art would appreciate that one may select different rates for rx_clk_1 and rx_clk_2 based in part on the modulation schemes and other considerations.

As illustrated in FIG. 1, when the preamble found signal indicates that the no preamble is found yet (e.g., the preamble found signal being 0), the system 100 is in an acquisition mode, in which the system is set to detect a preamble sequence of one of the modulation schemes. To detect a modulation scheme A preamble (e.g., 2- or 4-FSK scheme preamble), the CDR module A 102 may use a local clock signal at about 32 times the data rate to detect the +1, −1, +1, −1, . . . sequence and generate the 2-FSK clock and data output. For the operation of the regular 2- or 4-FSK, the rx_clk_1 clock signal may be set at about 32 times the data rate. To detect a modulation scheme B preamble (e.g., 3-FSK scheme preamble) the CDR module A 102 receives the rx_clk_1 clock signal at about 16 times the data rate, for example, and the CDR module B 104 receives 0, for example, from the respective input clock multiplexer 101, 107 for each CDR module 102, 104. Then, the CDR module A 102 instead of the CDR module B 104 may detect a 3-FSK demodulated preamble and generate the rx_data_a signal of 101010 . . . and the rx_clk_a clock signal at about 16 times the data rate. In some implementations, the input clock signal to the CDR module B 104 may be rx_clk_2 regardless of the preamble found signal as illustrated in FIG. 1. When the SerDes processor 108 determines that a 3-FSK preamble is found, for example, the preamble found signal may be 1, indicating the system 100 being in a data track mode, in which the system 100 is set to receive data. To receive 3-FSK modulated data beyond the preamble, the CDR module B 104 receives the rx_clk_2 clock at about 32 times the data rate, for example, from its input clock multiplexer 107, and the CDR module A 102 receives 0 from its input clock multiplexer 101. Then, the CDR module B 104 may generate the rx_data_b signal and the rx_clk_b clock at about 32 times the data rate.

When the rx_data_a, rx_clk_a, rx_data_b, and rx_clk_b signals are generated by either of the CDR module A 102 or the CDR module B 104, the data multiplexer 103 and the second clock multiplexer 105 may select the data and clock depending on the mode of the system 100 according to the preamble found signal. For example, when the preamble found signal is 0, indicating no preamble is found yet, the data multiplexer 103 may select the rx_data_a signal, and the second clock multiplexer 105 may select the rx_clk_a signal from the CDR module A 102 because the system 100 is in the acquisition mode for acquiring preamble phase lock to a signal modulated with modulation scheme B with the CDR module A 102. When the preamble found signal is 1, indicating a preamble is found, the data multiplexer may select the rx_data_b signal, and the second clock multiplexer 105 may select the rx_clk_b signal from the CDR module B 104 because the system 100 is in the tracking mode for tracking the signal modulated by modulation scheme B with the CDR module B 104. When the data and clock signals are selected by the data multiplexer 103 and the second clock multiplexer 105, the rx_data and rx_clk signals are sent to the re-sync and handover circuit 106.

The re-sync and handover circuit 106 may receive the rx_data signal, the rx_clk signal, and the mod A NCO counter signal 110 as inputs and may set an NCO counter value of the CDR module B 104 to a value mapped from the value of the NCO counter (mod A NCO counter 110) of the CDR module A 102 to synchronize the two CDR modules 102, 104 such that the acquisition from the CDR module A 102 can be handed off to the CDR module B 104. The re-sync and handover circuit 106 may output the NCO mod A counter signal 112 to the CDR module B 104. In some implementations, setting the NCO counter value of the CDR module B 104 to the value mapped from the NCO counter value of the CDR module A 102 may be performed in the CDR module B 104. In such implementations, the mod A NCO counter signal 110 may be directly sent from the CDR module A 102 to the CDR module B 104 or may be sent through other modules such as the signal estimator 202 (FIG. 2). In these cases, the re-sync and handover circuit 106 may not receive the mod A NCO counter signal 110, and the NCO mod A counter signal 112 may not be necessary. A person of ordinary skill in the art would appreciate that the NCO counter mapping may be performed in various ways as long as the NCO counter value of the CDR module B 104 is set to the NCO counter value of the CDR module A upon finding of a preamble. The re-sync and handover circuit 106 may generate the rx_data signal, the rx_clk signal, and the NCO mod A counter signal 112 as outputs. Further details of the re-sync and handover circuit 106 will be described later in connection with FIGS. 3-4C.

The serializer/deserializer (SerDes) processor 108 receives the rx_data signal and the rc_clk signal and determines whether a preamble is found by recognition of the pattern for the preamble. Initially, the SerDes processor 108 may output the preamble found signal of 0, indicating no preamble is found. When the SerDes processor 108 detects a preamble based on the rx_data and rx_clk signals, the SerDes processor may output the preamble found signal of 1, indicating that the preamble is found. Accordingly, the preamble found signal from the SerDes processor 108 determines which input clock signal, rx_data signal, and rx_clk signal would be selected as described above.

Figure 2A:
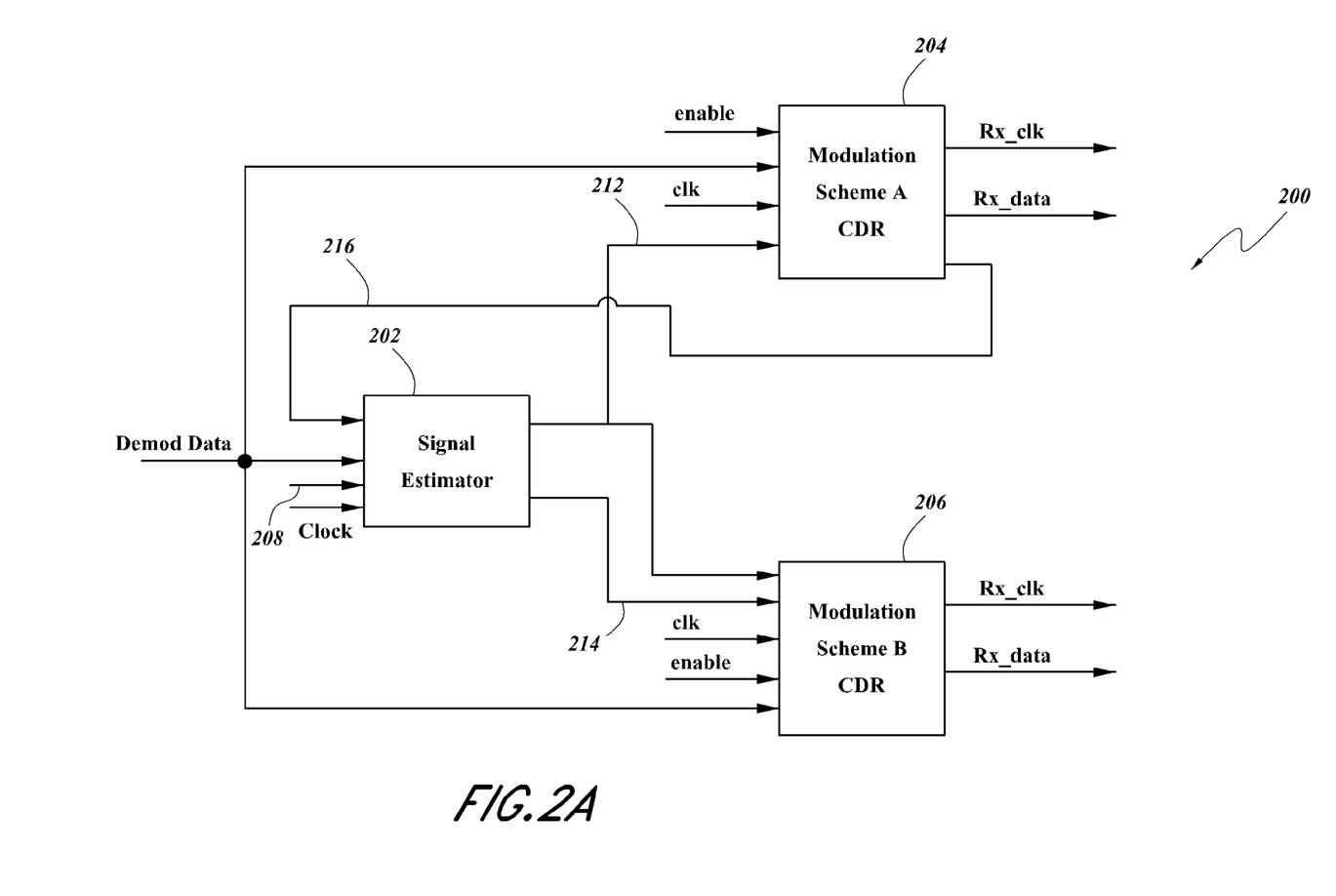
FIG. 2A is a schematic block diagram illustrating an example modular signal detection system according to one embodiment.

Referring to FIG. 2A, a schematic block diagram illustrating an example modular signal detection system will be described below. The illustrated system 200 includes the signal estimator 202, a CDR module A 204, and a CDR module B 206. The CDR module A 204 may be substantially similar to the CDR module A 102 (FIG. 1), and the CDR module B 206 may be substantially similar to the CDR module B 104 (FIG. 1). The system 200 is configured to receive a data signal and perform acquisition and detection as discussed below. In one embodiment, all or parts of the system 100 (FIG. 1) and the system 200 may be implemented in one system for modular signal acquisition and detection as disclosed herein. One or more modules of the system 200 may have additional input or output signals such as enable, reset, and clock signals not shown in FIG. 2 as they may be apparent to those with ordinary skill in the art or have been discussed above in connection with FIG. 1.

The CDR module A 204 may receive a demod data signal, an average signal estimate 212, an enable signal, and a clock signal. The CDR module A 204 may generate an rx_clk signal, an rx_data signal, and an NCO mod A counter signal 216 similar to how the CDR module A 102 (FIG. 1) may generate the rx_clk_a signal, the rx_data_a signal, and the mod A NCO counter signal 110 (FIG. 1) as described in connection with FIG. 1. Additionally, the CDR module A 204 may track the demod data signal to generate rx_data based on a dynamic threshold set by the average signal estimate 212 from the signal estimator 202. Generating the average signal estimate 212 will be described in further below. In one implementation, the CDR module A 204 may be a 4-FSK CDR module.

The CDR module B 206 may receive the demod data signal, an NCO mod A phase at preamble signal 214, an enable signal, and a clock signal. The NCO mod A phase at preamble signal 214 may be substantially similar to the NCO mod A signal 112 (FIG. 1). The CDR module B 206 may generate an rx_clk signal and an rx_data signal similar to how the CDR module B 104 (FIG. 1) may generate the rx_clk_b signal and the rx_data_b signal as described in connection with FIG. 1. Additionally, the CDR module B 206 may track the demod data signal to rx_data based on the dynamic threshold set by the average signal estimate 212 from the signal estimator 202. Generating the average signal estimate 212 will be described in further below. In one implementation, the CDR module B 206 may be a 3-FSK CDR module.

The signal estimator 202 may receive the NCO mod A counter signal 216, the demod data signal, a preamble found signal 208, and a clock signal. The NCO mod A counter signal 216 may be substantially similar to the mod A NCO counter signal 110 (FIG. 1), and the preamble found signal 208 may be substantially similar to the preamble found signal in FIG. 1. The signal estimator 202 may generate the average signal estimate 212 and the NCO mod A phase at preamble signal 214. When the preamble found signal 208 indicates that no preamble is found, the signal estimator 202 may measure the power level of the incoming demod data signal to determine an average estimated signal level. When the preamble found signal 208 indicates that a preamble is found, the signal estimator 202 may set the average signal estimate 212 to the average estimated signal level at the time so that the CDR module A 204 and the CDR module B 206 may track the demod data signal based on the dynamic threshold set by the average signal estimate 212. In one implementation, the average signal estimate 212 may be further adjustable with a programmable offset value. Adjustment of the average signal estimate 212 is further described in connection with FIG. 6 below.

Figure 2B:
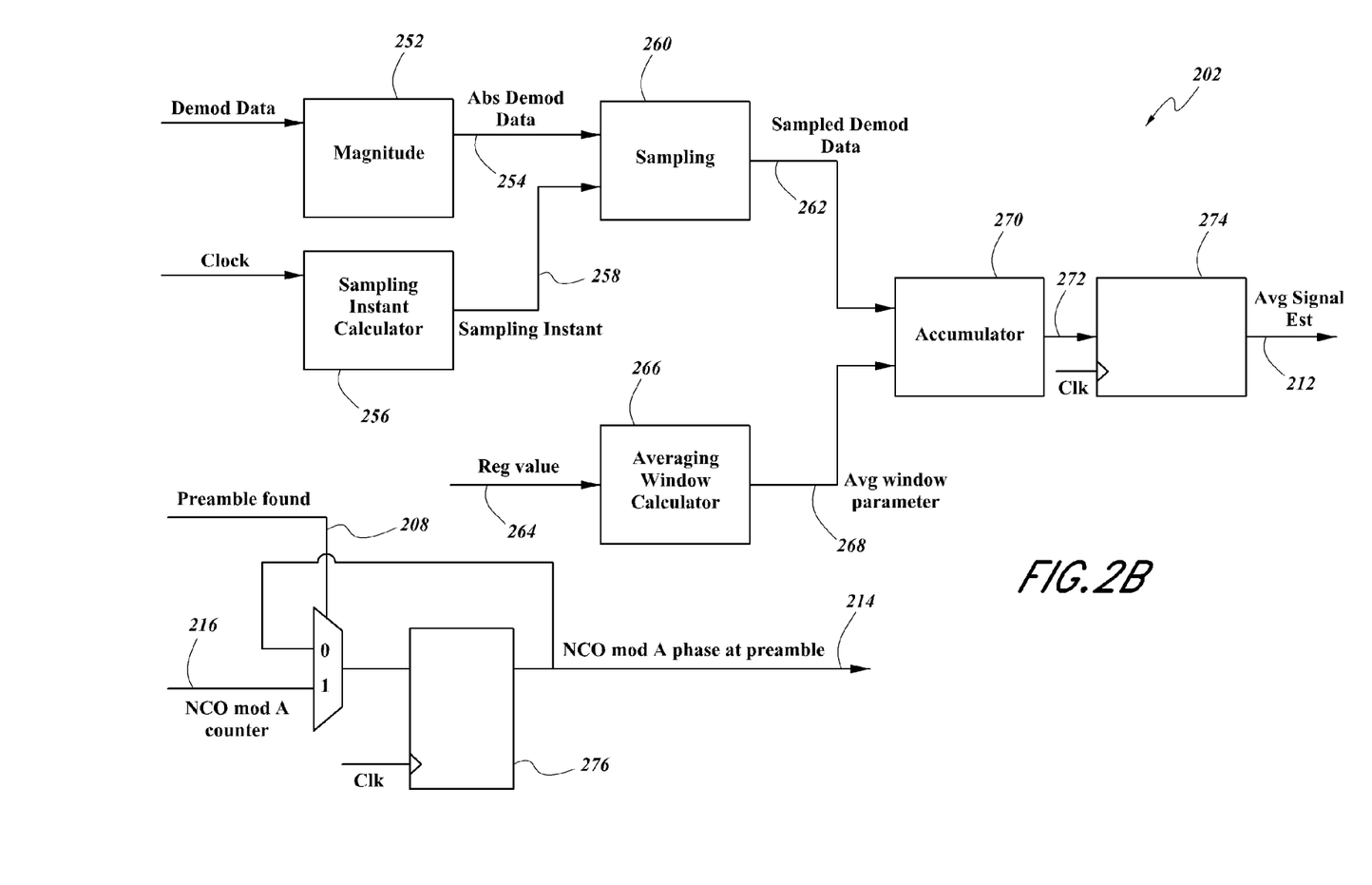
FIG. 2B is a schematic block diagram illustrating an example signal estimator according to one embodiment.

Referring to FIG. 2B, a schematic block diagram illustrating an example signal estimator will be described in detail. The signal estimator 202 may include a magnitude module 252, a sampling instant calculator 256, a sampling module 260, an averaging window calculator module 266, an accumulator 270, a signal estimate register 274, and an NCO register 276. The signal estimator 202 may receive a demod data signal, a clock signal, a preamble found signal 208, and an NCO mod A counter signal 216 and generate an average signal estimate 212 and an NCO mod A phase at preamble signal 214.

The magnitude module 252 may receive the demod data signal to generate an abs demod data signal 254, which may be the absolute value of the demodulated signal demod data. The demod data signal may be centered at zero, for example, and to determine the power level of the demod data signal, the absolute value of the demodulated data signal, demod data, may have to be determined. The magnitude module 252, for example, can be implemented with logic circuits that determine whether the sign bit of the demod data signal is 1 and invert the data bits of the demod data signal if the sign bit is 1.

The sampling instant calculator 256 may receive the clock signal and generates a sampling instant signal 258. The sampling instant calculator 256, for example, can be based on a counter at a particular clock rate (e.g., 32 times the data rate) and generate sample interval at every ¼ of a data bit interval by generating the sampling instant signal 258 with a unit width (e.g., 1/32 of the data bit width for implementations based on a clock rate 32 times the data rate). The sampling instant signal 258, for example, may be generated every 8 counts of the clock rate if the clock rate is at 32 times the data rate. The sampling instant signal 258 may represent a time instance within a data bit interval at which the abs demod data signal 254 is to be sampled. The width of the sample interval and the sampling instant may vary in other implementations.

The sampling module 260 may receive the abs demod data signal 254 and the sampling instant signal 258 to generate the sampled demod data signal 262. The sampling module 260 may sample the abs demod data signal capturing the absolute data value at each sampling instant within a data bit width indicated by the sampling instant signal 258.

The averaging window calculator module 266 may receive an reg value signal 264 to generate an avg window parameter signal 268. The reg value signal 264 may be a programmable value stored in a register, and the averaging window calculator module 266 determines how many samples of the sampled demod data signal 262 should be averaged based on the reg value signal 264. The reg value signal 264, for example, may indicate how many data bits should be averaged in the accumulator 270, and the avg window parameter signal 268 may be generated by the averaging window calculator module 266 to effectuate the averaging operation as indicated by the reg value signal 264.

The accumulator 270 may receive the sampled demod data signal 262 and the avg window parameter signal 268. The accumulator 270 may accumulate the sampled demod data signal 262 that is averaged by the average window defined by the avg window parameter signal 268 to determine the average power level to generate an accumulated output 272. For example, the reg value signal 264 may have indicated that two data bits should be averaged in the accumulator 270. Furthermore, in this example, the sample interval of the sampled demod data signal 262 may be at ¼ of a data bit. In such case, the accumulator 270 may take in the avg window parameter signal 268, which may indicate that 8 samples of the sampled demod data signal 262 should be averaged. The accumulator 270, then may add 8 samples of the sampled demod data signal 262 and divide it by 8 to generate the accumulated output 272. As the power level of the demod data signal changes, the averaged absolute value of sampled demod data may change, and the accumulated output 272, which represents the estimated average value of the data signal level, may dynamically change according to the preamble signal power level. The signal estimate register 274 may receive the accumulated output 272 and may update the average signal estimate 212 at each clock cycle.

The NCO register 276 may receive the NCO mod A counter signal 216 and the preamble found signal 208 to generate the NCO mod A phase at preamble signal 214. When the preamble found signal 208 indicates there is no preamble found, and the system 200 (FIG. 2A) is in the acquisition mode, the NCO mod A phase at preamble signal 214 may be held at its previous value. When the preamble found signal 208 indicates there a preamble is found, and the system 200 (FIG. 2A) is in the tracking mode, the NCO mod A counter signal 216 may be forwarded to the NCO register 276 to update the NCO mod A phase at preamble signal 214 at the next clock signal.

Figure 3:
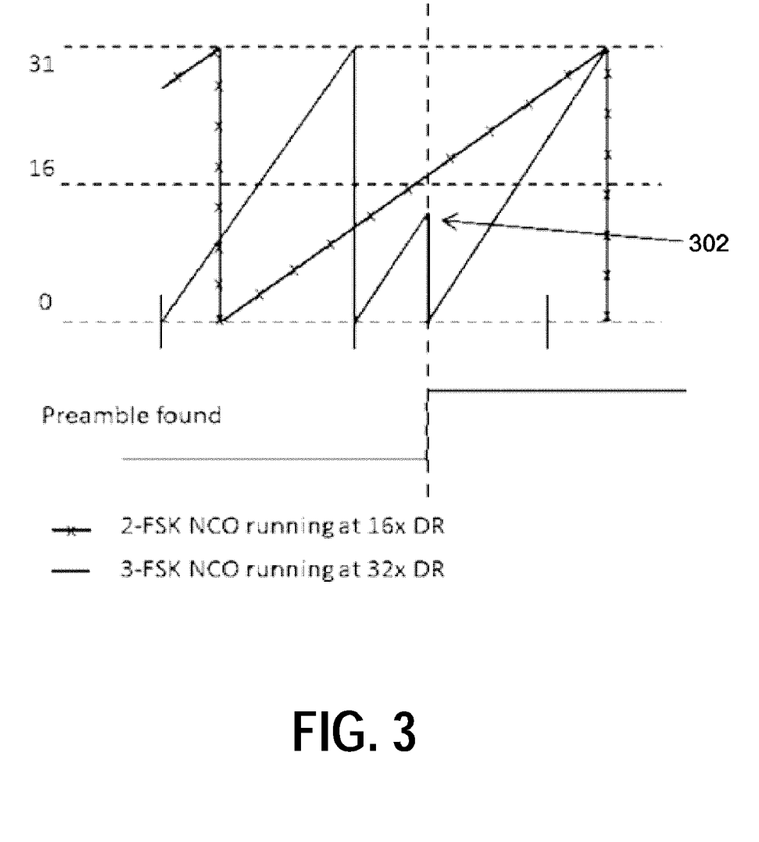
FIG. 3 is a timing diagram illustrating an example counter synchronizing according to one embodiment.

Referring to FIG. 3, a timing diagram illustrating an example of synchronizing the counters of the NCOs of the CDRs 102, 104 used for handover will be described below. The timing diagram of FIG. 3 illustrates two NCO counter graphs running at different multiples of the data rate, a preamble found signal graph, and synchronization of the two NCO counters at point 302. In this example, the marked NCO counter graph is a 2-FSK NCO of the CDR module A 102 (FIG. 1) running at about 16 times the data rate, and the unmarked NCO counter graph is a 3-FSK NCO running at about 32 times the data rate. As illustrated, the period of the NCO counter running at about 32 times the data rate is half the period of the NCO counter running at about 16 times the data rate. Because there is only one clock cycle of a 16× clock signal for every two clock cycles of a 32× clock signal, there is a mapping of two NCO counter values for the 2-FSK NCO to each counter value for the 3-FSK NCO as illustrated in FIG. 4B.

Also, in this example, the 2-FSK NCO counter and the 3-FSK NCO counter are initially out of sync, and their periods are not aligned although the period of the former is a perfect multiple of that of the latter. When the preamble found signal indicates that no preamble is found, which is represented as 0 or low in this example, the system 100 (FIG. 1) is in the acquisition mode, and the CDR module A 102 (FIG. 1), which is a 2-FSK module in this example, may use the rx_clk_1 signal, which is a clock signal 16 times the data rate in this example. While no preamble is found, the NCO clock for the CDR module A 102 (e.g., 2-FSK CDR) and the CDR module B 104 (e.g., 3-FSK CDR) may run their clocks independently, and the two clocks may be out of sync as illustrated in FIG. 3. When the preamble found signal indicates a preamble is found, which is represented as 1 or high in this example, the system 100 (FIG. 1) is in the tracking mode, and the clock signals for the CDR module A 102 (FIG. 1) and the CDR module B 104 (FIG. 1) may be synchronized at a point 302, upon recognition of the preamble by the SerDes processor 108.

The internal NCO counter value of the CDR module B 104 (FIG. 1) may be set at a mapped value based on the NCO counter value (the mod A NCO counter signal 110) of the CDR module A 102 (FIG. 1). In this example, at the point 302, the value of the 2-FSK NCO counter signal is at about 16 and the present value of the 3-FSK NCO counter is a little less than 16. The corresponding mapped NCO counter for the 3-FSK NCO in this example is about zero, the 3-FSK NCO counter is set as zero at point 302, the point at which the preamble is found. In one embodiment, the clock rates (rx_clk_1 and rx_clk_2) for the two CDR modules 102, 104 may differ by a different multiplication factor, and the two clocks (rx_clk_1 and rx_clk_2) may be offset by different counter value. In some implementations, the counter may be in reverse (i.e., counting from 31 to 0, for example). The counter mapping may take into account of these variables (e.g., relative clock speed or counter period, counter offset, and counting direction) with respect to the two different NCO counters to perform the mapping. The illustrated NCO clock synching may be implemented in a mapping module within the CDR module B 104, for example, and further details of NCO counter mapping will be described below in connection with FIGS. 4A-4C.

Figure 4A:
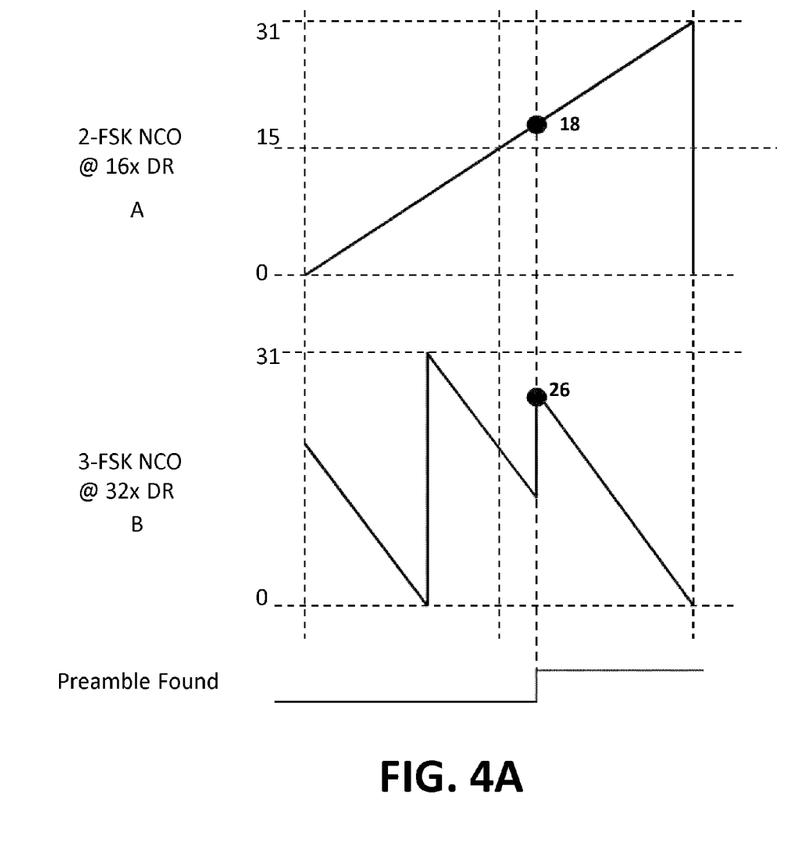
FIG. 4A is a timing diagram illustrating an example mapping of two counters according to one embodiment.
Figure 4B:
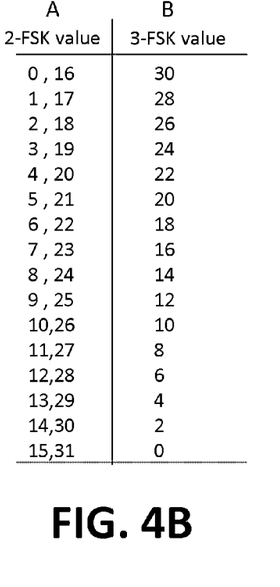
FIG. 4B is a table illustrating the example mapping of the two counters of FIG. 4A.

Referring to FIG. 4A, a timing diagram illustrating an example mapping of two counters will be described below. In this example, a 2-FSK NCO graph running at 16 times the data rate and an out-of-sync 3-FSK NCO graph running at about 32 times the data rate are illustrated. The CDR module A 102 (FIG. 1) may, for example, be a 2-FSK CDR module and use the clock rate of rx_clk_1 at about 16 times the data rate. The CDR module B (FIG. 1) may, for example, be a 3-FSK CDR module and use the clock rate of rx_clk_2 at about 32 times the data rate. In some embodiments, the CDR module may count the clocks in reverse (i.e., counting from 31 to 0, for example) as the 3-FSK NCO counter graph in FIG. 4A illustrates. In this example, the 2-FSK NCO counter is being mapped to the 3-FSK NCO counter whose period is out of sync with the period of the 2-FSK NCO counter period. In other examples, the mapping of the first counter to the second counter may involve two counter periods that are aligned. In this example, when the preamble found signal indicates the preamble is found, which is represented as 1 or high here, the counter value for the 2-FSK NCO is 18, and the corresponding counter value for the 3-FSK NCO is set at 26.

Referring to FIG. 4B, a table illustrating the example mapping of the two counters of FIG. 4A will be described below. Continuing with the example of FIG. 4A, the table in FIG. 4B illustrates how a 2-FSK NCO counter value, for example, may be mapped to a 3-FSK counter value. As discussed above, the 2-FSK NCO counter values in this example are mapped to corresponding in-sync 3-FSK NCO counter values. For example, according to the table in FIG. 4B, the 2-FSK NCO counter values of 2 and 18 are both mapped to the 3-FSK NCO counter value of 26 as illustrated in the timing diagrams in FIG. 4A. Details of the mapping implementation will be described further below in connection with FIG. 4C.

Figure 4C:
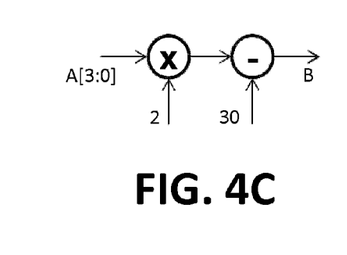
FIG. 4C is a partial schematic block diagram illustrating an example conversion of the two counters of FIGS. 4A and 4B.

Referring to FIG. 4C, a partial schematic block diagram illustrating an example conversion of the two counters of FIGS. 4A and 4B will be described below. The table in FIG. 4B may be implemented with operational modules that translate the value on the left column to the values on the right column. Initially, the 2-FSK NCO counter value may be a 5 bit value of A[4:0] when preamble is found. Then, as illustrated in the example table of FIG. 4B, the computation can be B=30−A×2, for which the most significant bit of A is dropped if A exceeds 15. The multiplication operation may be implemented with a shift register, for example. The mapping scheme illustrated in FIG. 4C may be implemented in a mapping module within the CDR module B 104 (FIG. 1) or within the re-sync and handover circuit 106 (FIG. 1) as discussed in connection with FIG. 1.

Figure 5:
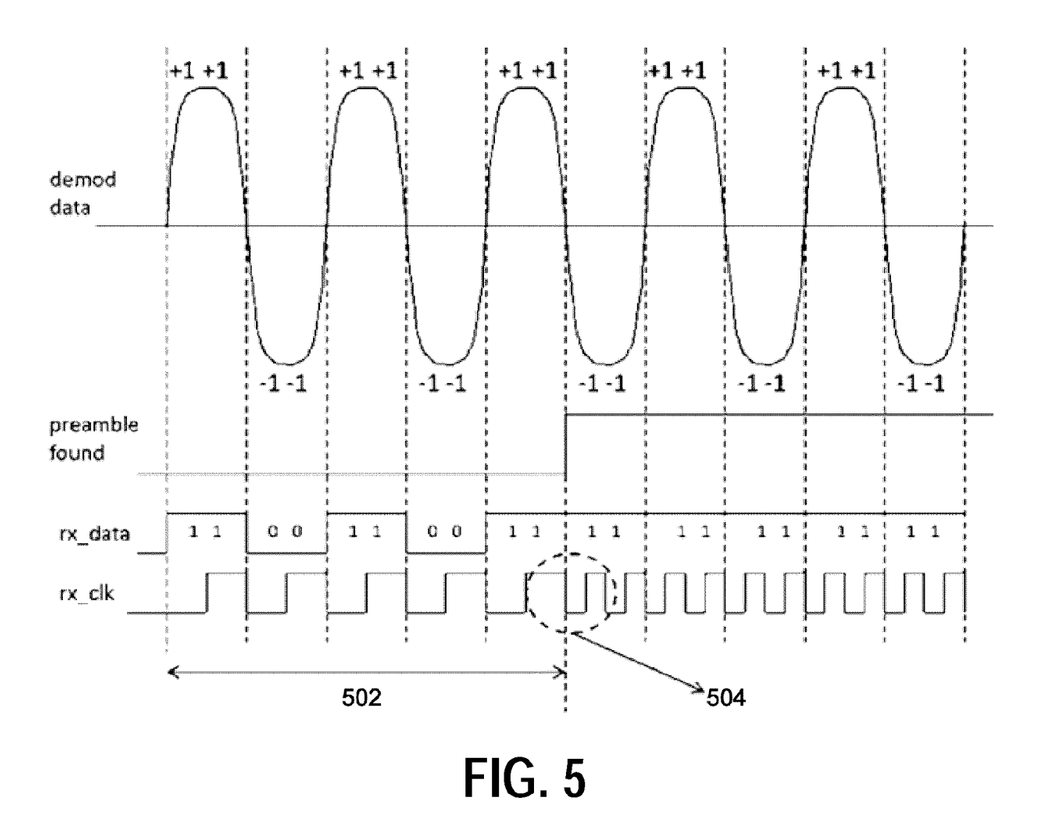
FIG. 5 is a timing diagram illustrating modular signal acquisition according to one embodiment.

Referring to FIG. 5, a timing diagram illustrating modular signal acquisition will be described below. During a preamble period 502, the rx_clk signal may be at a speed different from the regular recovered clock speed as a CDR module such as the CDR module A (FIG. 1) may use a reduced clock speed (e.g., rx_clk_1 in FIG. 1) to detect the preamble and generate the rx_data and rx_clk signals. When the preamble found signal indicates that a preamble is found, shown as 1 or high in the example in FIG. 5, at the time 504, the rx_clk signal may be at the regular speed as the tracking mode of a CDR module such as the CDR module B (FIG. 1) may take over to generate the rx_data and rx_clk signals. One non-limiting advantage of the system and method disclosed herein may be an effective use of eye alignment. Instead of detecting +1, +1 and −1, −1 at the regular acquisition clock speed (e.g., rx_clk_2 in FIG. 1), the system may detect +1 and −1 at the different clock speed (e.g., half the regular clock speed, rx_clk_1 in FIG. 1). Since one peak of the demodulated data preamble would correspond to +1 or −1 rather than +1, +1 or −1, −1, the acquisition of 3-FSK signal, for example, may be more efficient and the acquisition time may be reduced accordingly.

Figure 6:
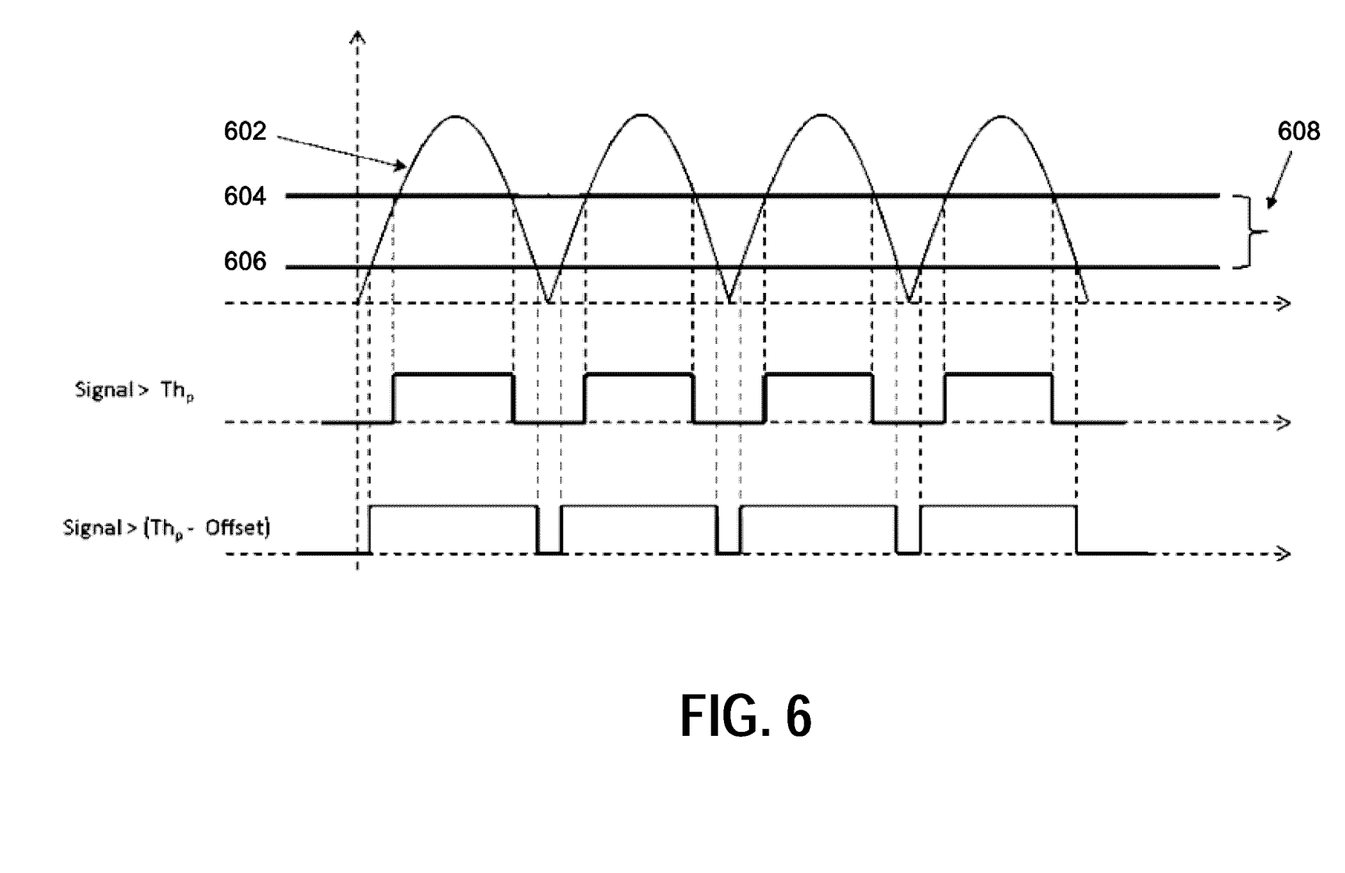
FIG. 6 is a timing diagram illustrating adaptive threshold of modular signal acquisition and detection according to one embodiment.

Referring to FIG. 6, a timing diagram illustrating adaptive threshold of modular signal acquisition and detection will be described below. The timing diagram includes rectified summed demodulated data 602, a preamble-based threshold 604, an adjusted threshold 606, and an offset 608. The preamble-based threshold 604, for example, may be substantially similar to the average signal estimate 212 (FIG. 2B) and may be determined by the signal estimator 202 (FIG. 2B). Instead of having a static threshold to determine data during the tracking mode, the dynamic threshold may adjust to the power level of the incoming data based on the preamble power level, and the signal above the preamble-based threshold $Th_p$ may be recognized as FIG. 6 illustrates. The preamble-based threshold 604 may be adjusted further by the offset 608 (e.g., an n-bit programmable offset value), in which case the signal above $Th_y$–offset may be recognized as FIG. 6 illustrates.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Applications

Furthermore, the disclosed methods, systems, and/or apparatus can be implemented into various electronic devices. Examples of the electronic devices can include, but are not limited to, consumer electronic products, parts of the consumer electronic products, electronic test equipment, etc. Examples of the electronic devices can also include memory chips, memory modules, circuits of optical networks or other communication networks, and disk driver circuits. The consumer electronic products can include, but are not limited to, wireless devices, a mobile phone, cellular base stations, a telephone, a television, a computer monitor, a computer, a hand-held computer, a personal digital assistant (PDA), a microwave, a refrigerator, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic device can include unfinished products.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An apparatus comprising:
    a first signal processing circuit configured to receive an input signal, wherein the first signal processing circuit is configured to acquire phase lock and/or track phase lock to the input signal for at least a first modulation scheme, wherein the first signal processing circuit is configured to sample a preamble portion of a waveform of the input signal at a first clock rate to acquire phase lock for a second modulation scheme;

a second signal processing circuit configured to receive the input signal, wherein the second signal processing circuit is configured to at least track phase lock to the input signal for the second modulation scheme at a second clock rate, wherein the second clock rate is faster than the first clock rate; and a controller configured to receive an indication of which of at least the first modulation scheme or the second modulation scheme is applicable, to activate the first signal processing circuit for acquisition and tracking of the input signal in the first modulation scheme, to activate the first signal processing circuit for acquisition of the input signal in the second modulation scheme, and to activate the second signal processing circuit for tracking of the input signal in the second modulation scheme.

2. The apparatus of claim 1, wherein the first modulation scheme is binary frequency shift keying (2-FSK) or 4-FSK.

3. The apparatus of claim 1, wherein the second modulation scheme is ternary frequency shift keying (3-FSK).

4. The apparatus of claim 1, wherein the first signal processing circuit acquires the input signal for the second modulation scheme based on a mapping of a first counter of the first signal processing circuit to a second counter of the second signal processing circuit.

5. The apparatus of claim 1, wherein the first signal processing circuit is configured to operate at half a clock rate of operation of the second signal processing circuit.

6. The apparatus of claim 1, wherein the first signal processing circuit and the second signal processing circuit comprise circuits that are configurable with programmable parameters such that the first signal processing circuit and the second signal processing circuit differ in behavior during operation.

7. The apparatus of claim 4, wherein the mapping is based on a phase indicator, wherein the first signal processing circuit is further configured to output the phase indicator, and the second signal processing circuit is further configured to receive the phase indicator and adjust the second counter.

8. The apparatus of claim 1, further comprising an estimator configured to determine average power level of the preamble portion and generate an estimator output.

9. The apparatus of claim 8, wherein the first signal processing circuit is further configured to adjust a threshold based on the estimator output after acquiring phase lock to the input signal, and the second signal processing circuit is further configured to track phase lock to the input signal based on the threshold.

10. The apparatus of claim 9, wherein the threshold is further adjusted by a programmable offset value.

11. An electronically-implemented method of signal processing, the method comprising:

sampling a preamble portion of a waveform of an input signal at a first clock rate with a preamble detection mechanism for a first modulation scheme to acquire phase lock for a second modulation scheme;

tracking phase lock to the input signal for the second modulation scheme at a second clock rate, wherein the second clock rate is faster than the first clock rate; and receiving an indication of which of at least the first modulation scheme or the second modulation scheme is applicable, to activate acquisition and tracking of the input signal in the first modulation scheme at the second clock rate, to activate acquisition of the input signal in the second modulation scheme at the first clock rate, and to activate tracking of the input signal in the second modulation scheme at the second clock rate.

12. The method of claim 11, wherein the first modulation scheme is binary frequency shift keying.

13. The method of claim 11, wherein the second modulation scheme is ternary frequency shift keying.

14. The method of claim 11, wherein the acquisition of the input signal for the second modulation scheme is based on a mapping of a first counter for the first clock rate to a second counter for the second clock rate.

15. The method of claim 11, wherein the first clock rate is at half of the second clock rate.

16. The method of claim 11, wherein the sampling a preamble portion, the tracking phase lock, and the receiving the indication comprise configuring programmable parameters such that the sampling a preamble portion, the tracking phase lock, and the receiving the indication differ in behavior during operation.

17. The method of claim 14, wherein the mapping is based on a phase indicator, wherein the phase indicator is a counter for the sampling of the preamble portion of the waveform of the input signal at the first clock rate to acquire phase lock for the second modulation scheme.

18. The method of claim 11, further comprising adjusting a threshold after acquiring phase lock to the input signal, and tracking phase lock to the input signal based on the threshold.

19. The method of claim 18, wherein the threshold is further adjusted by a programmable offset value.

20. An apparatus for signal processing, the apparatus comprising:

a means for sampling a preamble portion of a waveform of an input signal at a first clock rate with a preamble detection mechanism for a first modulation scheme to acquire phase lock for a second modulation scheme;

a means for tracking phase lock to the input signal for the second modulation scheme at a second clock rate, wherein the second clock rate is faster than the first clock rate; and a means for receiving an indication of which of at least the first modulation scheme or the second modulation scheme is applicable, to activate acquisition and tracking of the input signal in the first modulation scheme at the second clock rate, to activate acquisition of the input signal in the second modulation scheme at the first clock rate, and to activate tracking of the input signal in the second modulation scheme at the second clock rate.

* * * * *